United States Patent
Elliott et al.

(10) Patent No.: US 10,084,312 B2
(45) Date of Patent: Sep. 25, 2018

(54) SWITCHING CONTROLLER

(71) Applicant: Intelligent Energy Limited, Loughborough (GB)

(72) Inventors: Zachary Elliott, Loughborough (GB); Christopher Kirk, Loughborough (GB); Paul Adcock, Loughborough (GB); Kevin Kupcho, Loughborough (GB); Mark Braithwate, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 260 days.

(21) Appl. No.: 14/904,015

(22) PCT Filed: Jul. 21, 2014

(86) PCT No.: PCT/GB2014/052225
§ 371 (c)(1),
(2) Date: Jan. 8, 2016

(87) PCT Pub. No.: WO2015/011458
PCT Pub. Date: Jan. 29, 2015

(65) Prior Publication Data
US 2016/0164285 A1 Jun. 9, 2016

(30) Foreign Application Priority Data
Jul. 22, 2013 (GB) .................................. 1313031.5

(51) Int. Cl.
*H02J 1/10* (2006.01)
*B60L 11/18* (2006.01)
(Continued)

(52) U.S. Cl.
CPC ............. *H02J 1/10* (2013.01); *B60L 11/1887* (2013.01); *B60R 16/033* (2013.01);
(Continued)

(58) Field of Classification Search
CPC ....................................................... H02J 1/10
(Continued)

(56) References Cited

U.S. PATENT DOCUMENTS

2002/0057066 A1   5/2002   Autenrieth et al.
2004/0202900 A1  10/2004   Pavio et al.
(Continued)

FOREIGN PATENT DOCUMENTS

CN          102832658 A        12/2012

OTHER PUBLICATIONS

Hosseini et al.; "Multi-Input DC Boost Converter for Grid Connected Hybrid PV/FC/Battery Power System"; IEEE Electrical Power & Energy Conference; © 2010; 6 pages.
(Continued)

*Primary Examiner* — Joseph Chang
(74) *Attorney, Agent, or Firm* — Baker Hostetler LLP

(57) ABSTRACT

A switching controller for coupling one of a plurality of voltage sources to a load. The switching controller is configured to receive a characteristic of one of the plurality of voltage sources; for each of the plurality of voltage sources, set a proportion of a switching period of a control signal during which the voltage source is connected to the load, wherein the proportion of the switching period is set based on the received characteristic of one of the plurality of voltage sources; and control which of the plurality of voltage sources is connected to the load in accordance with the control signal.

13 Claims, 2 Drawing Sheets

(51) Int. Cl.
*H01M 16/00* (2006.01)
*B60R 16/033* (2006.01)
*H02J 1/00* (2006.01)

(52) U.S. Cl.
CPC ..... *H01M 16/006* (2013.01); *H02J 2001/004* (2013.01); *Y02T 90/34* (2013.01)

(58) Field of Classification Search
USPC .......................................................... 307/9.1
See application file for complete search history.

(56) References Cited

U.S. PATENT DOCUMENTS

| | | |
|---|---|---|
| 2006/0166050 A1 | 7/2006 | Autenrieth |
| 2012/0019072 A1 | 1/2012 | Tyagi |
| 2012/0019190 A1* | 1/2012 | Jones .................... H01M 10/44 320/101 |
| 2012/0319652 A1 | 12/2012 | Namou et al. |

OTHER PUBLICATIONS

Great Britain Patent Application No. 1313031.5; Search Report; dated Jan. 24, 2014; 4 pages.
International Search Report and Written Opinion dated Oct. 13, 2014 in International Application No. PCT/GB2014/052225.
Hosseini et al., "Multi-Input DC Boost Converter for Grid Connected Hybrid PV/FC/Battery Power System", EPEC, 2010 IEEE, IEEE Piscataway, NJ, US, Aug. 25, 2010, p. 1-6.

* cited by examiner

SWITCHING CONTROLLER

The invention relates to a switching controller for switching between a plurality of voltage sources, and in particular though not exclusively to a switching controller for switching between a fuel cell stack and a battery in a hybrid voltage source. In particular, the invention relates to a hybrid voltage source system comprising a fuel cell stack as a first voltage source and at least one other voltage source and the switching controller; a vehicle including the switching controller; and a method for operating a switching controller.

A hybrid voltage source can be used to power a load. A hybrid voltage source may be considered a system with multiple power sources, such as one or more fuel cell stacks and batteries. Hybridisation uses the ability to switch between voltage/power sources, for example, between a fuel cell stack and an on-board battery.

Hybridising a fuel cell stack and battery can be a useful strategy for providing power to a load, and can be done in a number of ways. In a fuel cell/battery hybrid voltage source, hybridisation allows for management of the fuel cell stack and power being supplied to an external device/load. It allows for moving at least some of the power load off the fuel cell stack and on to a battery, and vice versa. The power drawn from each source depends on the overall percentage of time that each source is connected in the circuit to supply power to the external device/load.

Often in such hybrid fuel cell/battery systems, the battery is used for system start-up and high peak loads, and the fuel cell stack runs to supply a base load or to recharge the battery. Power sharing between a battery and a fuel cell stack may be implemented using bi-directional DC-DC converters or a pair of DC-DC converter for the two voltage sources. However, these options can be expensive to implement and may require specialist engineering.

According to a first aspect of the invention there is a switching controller for coupling one of a plurality of voltage sources to a load. The switching controller is configured to receive a characteristic of one of the plurality of voltage sources. For each of the plurality of voltage sources, the switching controller is configured to set a proportion of a switching period of a control signal during which the voltage source is connected to the load, wherein the proportion of the switching period is set based on the received characteristic of one of the plurality of voltage sources. The switching controller is also configured to control which of the plurality of voltage sources is connected to the load in accordance with the control signal.

Advantageously, over the switching period, the control signal switches between the voltage sources such that they are connected to the load for the set proportion of time of the switching period. Thus, one of the voltage sources may be connected for a 20% time portion of the switching period while the other voltage source (in a two-source system) may be connected for the remaining 80% time portion of the switching period.

One of the plurality of voltage sources may be a fuel cell stack. Advantageously the switching controller may be used in a hybrid voltage source system comprising one or more fuel cell stacks and one or more other voltage sources.

One of the plurality of voltage sources may be a fuel cell stack, and the received characteristic of the fuel cell stack may be a function of one or more of: stack voltage, voltage of one or more fuel cells in the fuel cell stack, fuel cell stack current, fuel cell stack temperature and fuel cell stack fuel pressure. Advantageously, one or more of these parameters may be received by the controller and used to set the proportions of the switching period for each of the voltage sources in the voltage source system. Thus the proportions may be set by the switching controller based on feedback received from one or more of the fuel cell stacks (voltage sources) in the voltage source system.

The frequency of the switching period may be less than 1 kHz (that is, the switching period may be greater than 1 ms). The frequency of the switching period may be less than 500 Hz (that is, the switching period may be greater than 2 ms). The frequency of the switching period may be less than 200 Hz (that is, the switching period may be greater than 5 ms). The frequency of the switching period may be substantially 100 Hz (that is, the switching period may be substantially 10 ms). The frequency of the switching period is less than 100 Hz (that is, the switching period may be greater than 10 ms).

Compared with the system operating at a switching frequency of 10 kHz, energy losses due to switching between voltage sources may be reduced to: less than a tenth of the energy losses if operating at less than 1 kHz; less than 5% of the energy losses if operating at less than 500 Hz; less than 2% of the energy losses if operating at less than 200 Hz; around 1% of the energy losses if operating at around 100 Hz; and less than 1% of the energy losses if operating at less than 100 Hz.

If one of the voltage sources in the system is a fuel cell stack and the other voltage source operates at a higher voltage then switching between the stack and the other voltage sources may cause current/energy to flow back to the fuel cell stack, which may degrade the stack. Compared with the system operating at a switching frequency of 10 kHz, energy flow back to the fuel cell stack due to switching between voltage sources may be reduced to: less than a tenth of the energy flow back if operating at less than 1 kHz; less than 5% of the energy flow back if operating at less than 500 Hz; less than 2% of the energy flow back if operating at less than 200 Hz; around 1% of the energy flow back if operating at substantially 100 Hz; and less than 1% of the energy flow back if operating at less than 100 Hz.

One of the plurality of voltage sources may be a battery. Thus advantageously the switching controller may be used with a hybrid voltage source system comprising a battery as a voltage source in the power supply system.

One of the plurality of voltage sources may be a fuel cell, and another of the plurality of voltage sources may be a battery connected to an output of the voltage sources via a charger. The switching controller may be configured to, when the fuel cell stack generates a voltage greater than a predefined voltage set point: increase the current drawn from the fuel cell stack; and supply current to the battery charger from the output using the increased current drawn from the fuel cell stack. Thus advantageously, the switching controller may control a hybrid voltage source system by using surplus current generated by a fuel cell stack voltage source to recharge a battery voltage source in the system. This advantageously makes use of the a fuel cell's capability to generate current surplus to that required to power a load, and use that excess current to recharge a battery voltage source. This use of current from the fuel cell to recharge the battery may be termed "active charging". If the fuel cell cannot provide enough current to fully power the load, then the battery may be connected to the circuit load for a portion of the switching period to provide the remainder of the current required. This sharing of current supply capability between voltage sources may be termed "battery blending".

A single DC-DC converter may be provided to receive power from the plurality of voltage sources connected to the load in accordance with the control signal and output the received power. Advantageously, using a single DC-DC converter configured to receive voltage from each of a plurality of voltage sources in the power supply system may allow for a hybrid voltage source system to be manufactured cost effectively.

For each of the plurality of voltage sources, a switch may be coupled between the associated voltage source and the load. Each switch may be configured to connect the associated voltage source to the load in accordance with the control signal. Advantageously the switching controller may send the control signals to each switch to switch each voltage source into or out of the circuit to power the load. Each switch may be a field effect transistor switch.

A delay period may be included in the switching period between the portions of the switching period of the control signal during which one of the voltage sources is connected to the load.

Advantageously, including such a delay period may allow for precise control of the switching of the voltage sources into and out of the circuit. The delay period may be less than 10 μs. Alternatively, no delay may be provided.

During the proportion of the switching period assigned to a particular voltage source, the controller may be configured to connect only the particular voltage source to the load. Thus advantageously, only one voltage source may be connected to power the load at any one time.

According to a further aspect of the invention there is provided a hybrid voltage source comprising a plurality of voltage sources and the switching controller as described in the first aspect of the invention.

According to a further aspect of the invention there is provided a method of operating a switching controller for coupling one of a plurality of voltage sources to a load. The method comprises:

for each of the plurality of voltage sources, setting a proportion of a switching period of a control signal during which the voltage source is connected to the load, the proportion of the switching period set based on a received characteristic of one of the plurality of voltage sources; and controlling which of the plurality of voltage sources is connected to the load in accordance with the control signal.

According to a further aspect of the invention there is provided a vehicle comprising a switching controller as described in the first aspect of the invention.

This disclosure relates to using battery blending and active charging to more effectively utilise the fuel available in a fuel cell stack in a hybrid fuel cell system, with low additional hardware cost or engineering of a standard hybrid fuel cell system. Battery blending refers to using two or more voltage sources to power a load, by connecting each source in turn into the hybrid voltage source circuit and cycling through the sources to draw power from them. Active charging refers to drawing power from a fuel cell stack voltage source to power a load, and drawing additional power from that fuel cell stack voltage source to charge another voltage source (such as a battery).

Advantageously, the in-system commissioning of new fuel cells in a hybrid fuel cell system may be improved according to examples disclosed herein. Advantageously, more effective use of the fuel available to a fuel cell stack in a hybrid voltage source may be made using systems disclosed herein.

The invention will now be described by way of example only, with reference to the appended drawings in which.

Figure 1:
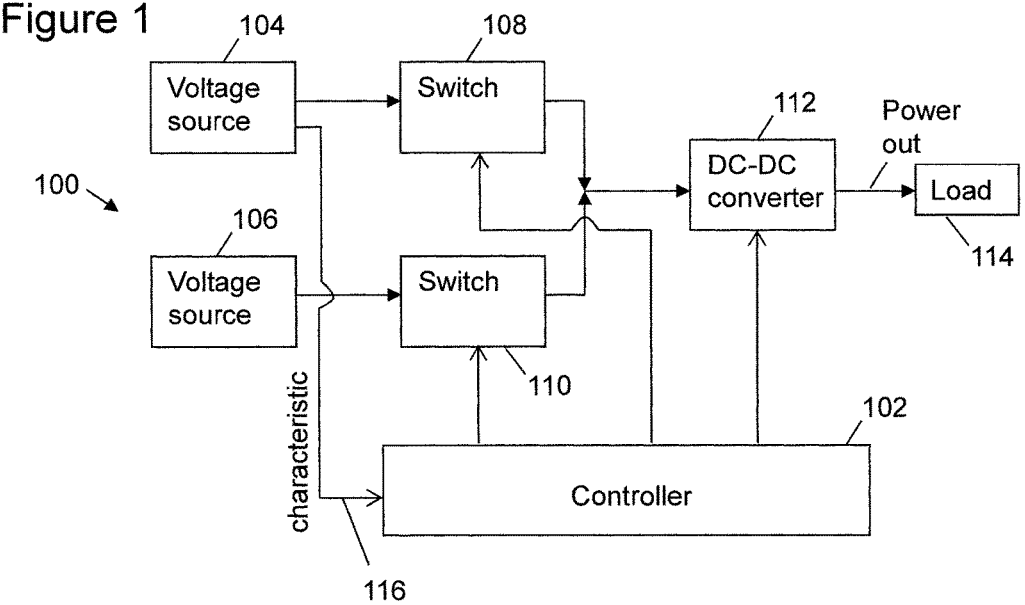
FIG. 1 illustrates a schematic diagram of a hybrid voltage source comprising a switching controller.

Various embodiments described below comprise a switching controller 100; 200 for coupling one of a plurality of voltage sources 104, 106; 240, 206 to a load 114; 214, the switching controller 100; 200 configured to: receive a characteristic of one of the plurality of voltage sources 104, 106; 240, 206; for each of the plurality of voltage sources 104, 106; 240, 206, set a proportion 304, 306 of a switching period 302 of a control signal during which the voltage source 104, 106; 240, 206 is connected to the load 114; 214, wherein the proportion 304, 306 of the switching period 302 is set based on the received characteristic of one of the plurality of voltage sources 104, 106; 240, 206; and control which of the plurality of voltage sources 104, 106; 240, 206 is connected to the load 114; 214 in accordance with the control signal.

FIG. 1 illustrates an example embodiment of a hybrid voltage source 100 comprising a switching controller 102. Two voltage sources 104, 106 are provided. Each voltage source 104, 106 is associated with a switch 108, 110. Each switch 108, 110 is coupled between its associated voltage source 104, 106 and a load 114, and is configured to connect the associated voltage source 104, 106 to the load 114 in accordance with a control signal from the switching controller 102. The switches 108, 110 are connected to the load via a single DC-DC converter 112. The switching controller 102 provides control signals to each switch 108, 110 and to the DC-DC converter 112. The controller 102 provide control signals, for example, to close/open each switch 108, 110 and to the DC-DC convertor to enable/disable the voltage supply to the load.

The switching controller 102 couples one of the two voltage sources 104, 106 to the load 114 at any one time in accordance with the control signal. Firstly, the switching controller 102 receives a characteristic 116 of one of the voltage sources 104. For example, the characteristic 116 may be the voltage of the voltage source 104. For each of the voltage sources 104, 106, the switching controller 102 then sets a proportion of a switching period of the control signal, during which the voltage source 104, 106 is connected to the load 114. The proportion of the switching period is set based on the received characteristic 116 of the voltage source 104.

The switching controller 102 controls which of the voltage sources 104, 106 is connected to the load 114 in accordance with the control signal. The switching controller 102 is configured to send a control signal to each switch 108, 110 of each voltage source 104, 106, to connect or disconnect each voltage source 108, 110 in the circuit 100 to power the load 114.

The DC-DC converter 112 is configured to receive the power from each voltage source 104, 106, provide voltage conversion as required and provide the power to the load 114.

Thus, the switching controller 102 provides the control signal to the switches 108, 110 to switch between the voltage sources 104, 106 over a switching period. The proportion of the switching period for which each voltage source 104, 106 is connected to the load 114 is determined from the received characteristic(s). This is described in more detail below.

Figure 2:
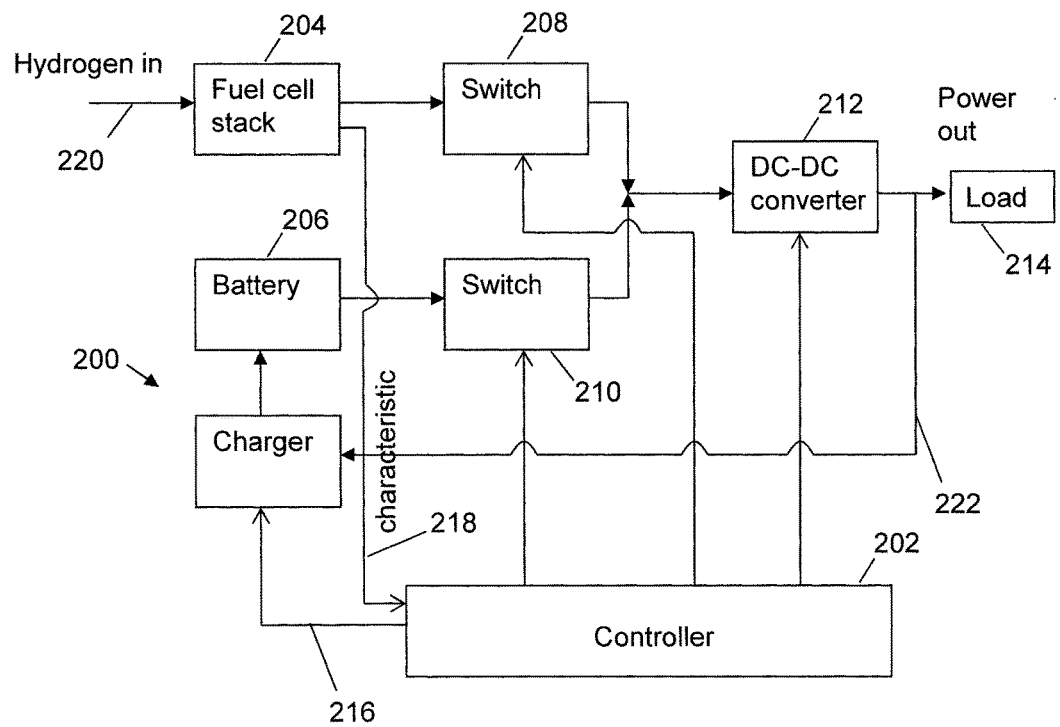
FIG. 2 illustrates a schematic diagram of a hybrid voltage source comprising a switching controller, a fuel cell stack and a battery with a battery charger.

FIG. 2 illustrates a second example embodiment of a hybrid voltage source 200 comprising a switching controller 202 with elements in common with the hybrid voltage source 100 shown in FIG. 1.

In FIG. 2, one of the two voltage sources is a fuel cell stack 204 with a supply of fuel 220, such as hydrogen. The other voltage source is a battery 206. The circuit 200 includes a battery charger 216 connected to the battery 206 and to the output of a single DC-DC converter 212. The battery charger 216 is controlled by the controller 202. There is also a connection 222 from the output of the DC-DC converter 212 to supply power to the charger 216.

The switching controller 202 receives a characteristic 218 of one of the voltage sources, in this example the fuel cell stack 204. The received characteristic 218 of the fuel cell stack 204 may be a function of the stack voltage, a function of one or more cells in the fuel cell stack 204, a function of stack current, a function of stack temperature and/or a function of the hydrogen pressure 220 supplied to the fuel cell stack 204, for example. The fuel cell stack voltage will fall in response to increased electrical loads 214, reduced levels of reactants (hydrogen and oxygen, for example) or degradation/malfunction of the fuel cell stack 204.

Based on the received characteristic 218, the switching controller 202 sets a proportion of the switching period of the control signal, during which the fuel cell stack 204 or the battery 206 is connected to the load 214. The switching controller 202 controls which of the voltage sources 204, 206 is connected to the load using the control signal. Thus, the switching controller 202 provides the control signal to the switches 208, 210 to switch between the voltage sources 204, 206 over a switching period.

The "on time" ratio between the battery 204 and fuel cell stack 206 (that is, the proportion of the switching period of the control signal for which each voltage source 204, 206 is connected to the load 214) is adjusted by the switching controller 202. The switching controller 202 may thus try to maintain a particular system set point related to fuel cell stack performance, as discussed in relation to FIG. 4.

In the examples of FIGS. 1 and 2, the switching controller 102; 202 may be a microcontroller with associated software, a fixed integrated circuit (IC) such as a field programmable gate array (FPGA) device, or an intelligent control device like a programmable controller (PC) or a programmable logic controller (PLC). The switches 108, 110; 208, 210 used to perform the switching may be field effect transistor (FET) switches, such as metal-oxide-semiconductor FETs (MOSFETs), for example.

In the examples of FIGS. 1 and 2, a single DC-DC converter 112; 212 is used. Switching the input to the single DC-DC converter between the voltage sources 104, 106 (such as the fuel cell stack 204 and the in-system battery 206) allows efficient sharing of the overall system load by controlling the amount of power taken from each source 104, 106; 204, 206 using the time it is connected to the load over a switching period. This allows for hybridisation of a multi voltage source system (such as a fuel cell stack 204/battery 206 system) at a low cost due to the use of one DC-DC converter 112; 212 rather than, for example, a bi-directional DC-DC converter or a pair of DC-DC converters.

As an example of the operation of the hybrid voltage source of FIG. 2, initially the fuel cell stack 204 may be able to support 100% of the load 214. In this situation the proportion of the switching period set to connect the fuel cell stack 204 is 100%, while the proportion of the switching period of the control signal set to connect the battery 206 is 0% (so the battery 206 is not connected). The control signal from the controller 202 therefore controls the switches 208, 210 such that over each switching period the fuel cell stack 204 is connected to the load 204 for 100% of the time.

In the event of a high electrical load 214 which cannot be fully supported by the fuel cell stack 204 (either because the load 214 is beyond the operating range of the fuel cell stack 204 or because the fuel cell stack 204 has just started up and is not yet up to full operating power) the fuel cell stack voltage may begin to fall. The switching controller 202 may receive the fuel cell stack voltage reading 218 and, in response, sets a higher proportion of the switching period to be covered by the battery 206, and a lower proportion of the switching period of the control signal to be covered by the fuel cell stack 204. This then reduces the load on the fuel cell stack 204 and enables the load 214 to continue being powered. The control signal from the controller 202 therefore controls the switches 208, 210 such that, during each switching period, the fuel cell stack 204 is connected to the load 204 for part of the time, and the battery 206 is connected to the load 204 for part of the time such that they share the power requirement of the load.

It may be considered that the switching controller 202 is configured to set the sharing ratio between the fuel cell stack 204 and battery 206 in response to changes in fuel cell stack voltage (or some other received characteristic/parameter 218). In this way, the hybrid voltage source 200 can keep running without having to shut down completely. Also, by sharing the proportion of time each voltage source 204, 206 is connected to the load 214 over a fixed switching period, power supply to the load 214 is maintained without needing to transfer the whole load to the battery 206, thereby providing efficient use of the available power from the voltage sources 204, 206 in the hybrid voltage source 200.

Figure 3:
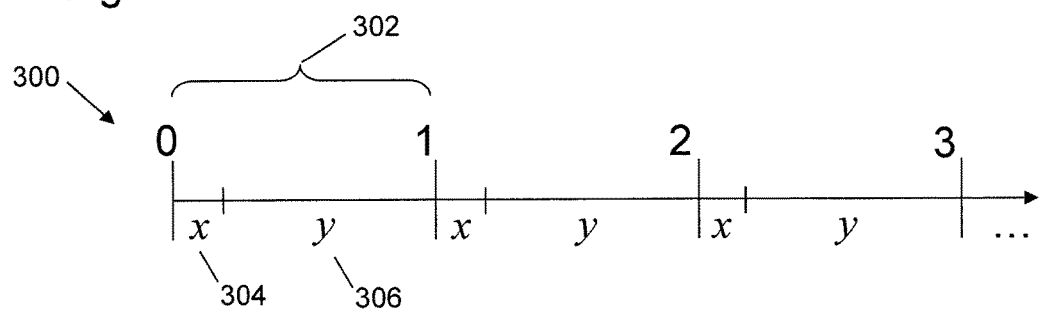
FIG. 3 illustrates a schematic diagram of a control signal with a switching period apportioned between two voltage sources x and y.

FIG. 3 illustrates an example schematic diagram of a control signal 300 with a switching period 302 apportioned between two voltage sources "x" 304 and "y" 306. The control signal 300 has a fixed switching period 302, in that this period 302 is the same length of time independent of the proportion of the switching period 302 allocated to each of the voltage sources "x" 304 and "y" 306. The control signal 300 may similarly be considered to have a fixed switching frequency.

For example, both voltage sources "x" 304 and "y" 306 in the hybrid voltage source can be used to power the load (if one voltage source alone can not provide enough power to fully power the load). The hybrid voltage source may be said to perform "battery blending" since two voltage sources/batteries, "x" and "y", are used to power the same load. The "on-time" (that is, the time during the switching period for which a particular voltage source is connected to the load) may be set such that average amount of energy drawn by the load (that is, drawn by the DC-DC converter for powering the load) can be shared between the two voltage sources "x" 304 and "y" 306.

Voltage source "x" 304 may be a fuel cell stack and voltage source "y" 306 may be a battery. A 5 W system load could be shared 80%:20% between the fuel cell stack and the battery. This would be done by using a 4:1 "on-time". Thus the fuel cell stack is connected to provide power for 80% of the switching period, and the battery is connected to provide power for the remaining 20% of the switching period. So if switching between the two sources is performed 100 times per second (that is, at a switching frequency of 100 Hz) then the switching controller would switch the fuel cell stack into the circuit for 8 ms, then disconnect the fuel cell stack, and then switch the battery into the circuit for 2 ms. This would mean that the 5 W load would take 4 W from the fuel cell stack and 1 W from the battery (ignoring system losses).

Switching controllers disclosed herein may advantageously be used during system start up, during which a hybrid voltage source comprising a fuel cell system and a battery is initially switched on from being powered off. At system start-up, the fuel cell stack may take some time before it is able to support its maximum load. The switching controller will try to maintain a particular fuel cell stack voltage by setting the proportion of the switching period for which the fuel cell stack is connected to the load in accordance with a received parameter, such as the fuel cell stack voltage, and increasing the load on the fuel cell stack as its ability to support it increases. In this way the fuel cell stack will be allocated as much load as it can handle up to 100%, but the full load required by the end load is able to be drawn from the hybrid voltage source for the whole time by using the battery as a power source when the power available from the fuel cell alone is not enough to support the load.

Switching controllers disclosed herein may advantageously be used in system commissioning of new fuel cell stacks as part of a hybrid voltage source. Because the load on the fuel cell stack can be controlled to achieve a particular fuel cell stack voltage according to the control signal, the hybrid voltage source will be able to operate with a new un-commissioned fuel cell stack and still provide maximum power output. This may be achieved by supplementing the available fuel cell stack power with power drawn from the battery. As the fuel cell stack's performance improves and its voltage rises, the switching controller will set a higher proportion of the switching period of the control signal for connecting the fuel cell stack to the load until the fuel cell stack is fully commissioned and, for example, able to support 100% of the load.

Switching controllers disclosed herein may advantageously be used for "active charging", in which the battery is charged using additional power available from the fuel cell stack after the power required by the load has been drawn from the fuel cell stack. Active charging is illustrated schematically in FIG. 4.

Figure 4:
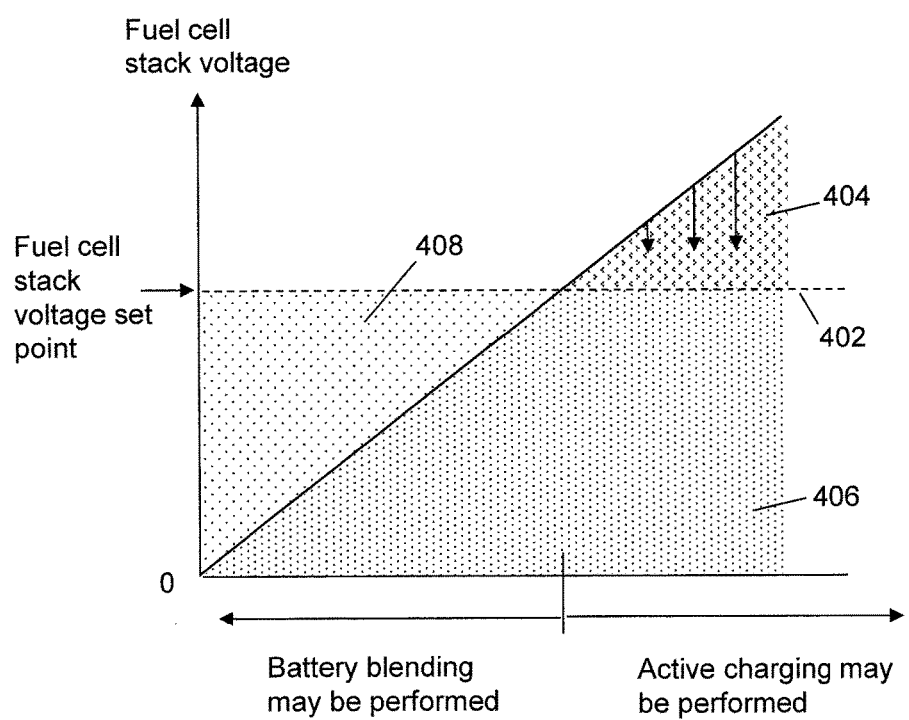
FIG. 4 illustrates a schematic diagram of active charging and battery blending with reference to a fuel cell stack voltage set point.

FIG. 4 relates to a hybrid voltage source comprising a fuel cell stack and a battery as in FIG. 2. The schematic plot of FIG. 4 shows the fuel cell stack voltage and a fuel cell stack voltage set point 402, which in this example is the voltage required to fully power the load. Region 406 represents the voltage of the fuel cell stack which is available for powering the load.

If the fuel cell stack is not able to support 100% of the system load then the switching controller can allocate a portion of the switching period of the control signal for connecting the fuel cell stack to the load and allocate another portion of the switching period of the control signal for connecting the battery to the load. Thus, if the fuel cell stack voltage is below a predetermined set point 402, the switching controller can switch between drawing power from the fuel cell stack and from the battery to reduce the load on the fuel cell stack. Therefore, if the fuel cell stack voltage 406 is below the fuel cell stack voltage set point 402, "battery blending" is used to supplement the voltage available from the fuel cell stack 406 using the voltage available from the battery 408. No active charging takes place in such a situation.

However if the fuel cell stack is able to support 100% of the load then active charging may be used to increase the load on the fuel cell stack. If the fuel cell stack voltage is above the predetermined set point 402, then the switching controller can allocate the switching period of the control signal for connecting the fuel cell stack to the load such that the power drawn from the fuel cell stack is increased, thereby decreasing the fuel cell stack voltage, as indicated by the arrows in the region 404. The additional load (power drawn) from the fuel cell stack may be provided to the battery via a battery charger 216, thereby actively charging the battery when the fuel cell is able to provide enough power to both power 100% of the load and provide extra power for battery charging.

Active charging therefore increases the battery charging current in response to increasing fuel cell stack voltage. By charging the battery at a larger current the load on the fuel cell stack is increased and its voltage reduced. This provides the benefit of being able to control the fuel cell stack's operating voltage and also allows for efficient use of the available power from the fuel cell stack, by charging the battery without overloading the fuel cell stack.

Thus, the switching controller can be used to operate a hybrid voltage source (having a fuel cell stack and a battery). When the fuel cell cannot provide 100% of the power required by the load, the switching controller sets the control signal such that the battery supplements the power supplied by the fuel cell to fully power the load (battery blending 406). If the fuel cell is able to provide more that 100% of the power required by the load, the additional power can be used to charge up the battery (active charging 404). The more power that becomes available from the fuel cell stack, the more load will be drawn from the fuel cell stack (up to 100%) and then once at 100%, any extra power that becomes available will be used to charge the system battery. If the amount of power available from the fuel cell stack dips, the battery will be used to temporarily fill the shortfall in available power. This is a very useful strategy to deal with fluctuations in fuel supply and ensure efficient utilisation of the available fuel.

A hybrid voltage source with a switching controller as disclosed herein can reduce the load on the fuel cell stack if it is unable to support the full load by allowing power to be drawn from the battery. This allows the hybrid power source to output power when it might otherwise have needed to shutdown if no battery was available to be used. It may manage deficiencies in fuel supply response (that is, if not enough fuel is supplied to the fuel cell for the fuel cell stack to generate enough power to maintain power to the load). The battery may be used to supplement the fuel cell stack during periods of low fuel pressure. The fuel cell stack may be run at an efficient point on the stack's IV curve by managing the effective current drawn from the fuel cell stack. This may provide an efficient fuel cell power supply system. Further, by having short pulses of fuel cell stack current (using high frequency switching) it may be possible to take advantage of the fuel cell stack bulk capacitance to help overcome mass transport limitations. This may allow a higher stack voltage to be sustained, therefore improving efficiency. Higher frequency switching may be beneficial to take advantage of the fuel cell stack capacitance.

In the examples described above, a characteristic from a fuel cell stack is provided to the controller for the controller to set the proportions of the switching period of the control signal. In other examples, the characteristic may be of a battery (such as a battery charge level or battery temperature). In other examples, more than one characteristic may be provided to the controller. The more than one characteristic may be from the same voltage source (such as the voltage and temperature of the fuel cell stack voltage source) or may be from more than one voltage source (such as the level of hydrogen supplied to the fuel cell stack voltage source and the battery charge level remaining in the battery voltage source).

In the examples described above, two voltage sources are shown in the hybrid voltage systems 100; 200. In other examples more than two voltage sources may be present and the switching controller may be configured to set a proportion of a switching period of a control signal for each of the more than two voltage sources. For example, a system may comprise two fuel cell stacks and a battery (thus three voltage sources are present). The controller may set the proportions of the switching period of the control signal to switch each voltage source in to the circuit to power a load for a proportion of the switching period.

It will be appreciated that features described in regard to one example may be combined with features described with regard to another example, unless an intention to the contrary is apparent.

The invention claimed is:

1. A switching controller to couple one of a plurality of voltage sources to a load, wherein one of the plurality of voltage sources is a fuel cell stack and another is a battery voltage source, the switching controller configured to:
   receive a characteristic of the fuel cell stack;
   for each of the plurality of voltage sources, including but not limited to the fuel cell stack, set a proportion of a fixed switching period of time of a control signal during which the voltage source is connected to the load, wherein the proportion of the switching period is set based on the received characteristic of the fuel cell stack; and,
   control which of the plurality of voltage sources is connected to the load in accordance with the control signal and the set proportions, such that an average energy provided to the load over the switching period is shared between the fuel cell and the other voltage sources and surplus, from the fuel cell, is provided to actively recharge the battery voltage source.

2. The switching controller of claim 1, wherein the received characteristic of the fuel cell stack is a function of one or more of: stack voltage, voltage of one or more fuel cells in the fuel cell stack, stack current, stack temperature and fuel cell stack fuel pressure.

3. The switching controller of claim 1, wherein the frequency of the switching period is less than 1 kHz.

4. The switching controller of claim 1, wherein the frequency of the switching period is less than 100 Hz.

5. The switching controller of claim 1, wherein one of the plurality of voltage sources is a battery.

6. The switching controller of claim 1, wherein:
   another of the plurality of voltage sources is a battery connected to an output of the voltage sources via a charger; and,
   the switching controller is configured to, when the fuel cell stack generates a voltage greater than a predefined voltage set point:
      increase the current drawn from the fuel cell stack; and,
      supply current to the battery charger from the output using the increased current drawn from the fuel cell stack.

7. The switching controller of claim 1, wherein a single DC-DC converter is provided to:
   receive power from the plurality of voltage sources connected to the load in accordance with the control signal, and,
   output the received power.

8. The switching controller of claim 1, wherein, for each of the plurality of voltage sources, a switch is coupled between an associated voltage source and the load, each switch configured to connect the associated voltage source to the load in accordance with the control signal.

9. The switching controller of claim 7, wherein each switch is a field effect transistor switch.

10. The switching controller of claim 1, wherein, during the proportion of the switching period assigned to a particular voltage source, the controller is configured to connect only the particular voltage source to the load.

11. A hybrid voltage source comprising:
   a plurality of voltage sources; and,
   the switching controller of claim 1.

12. A method of operating a switching controller for coupling one of a plurality of voltage sources to a load, wherein one of the plurality of voltage sources is a fuel cell stack and another is a battery voltage source, the method comprising:
   receiving a characteristic of the fuel cell stack;
   for each of the plurality of voltage sources, including but not limited to the fuel cell stack, setting a proportion of a fixed switching period of time of a control signal during which the voltage source is connected to the load, the proportion of the switching period set based on a received characteristic of the fuel cell stack; and,
   controlling which of the plurality of voltage sources is connected to the load in accordance with the control signal and the set proportions such that an average energy provided to the load over the switching period is shared between the fuel cell and the other voltage sources, and surplus, from the fuel cell is provided to actively recharge the battery voltage source.

13. A vehicle having switching controller to couple one of a plurality of voltage sources to a load, wherein one of the plurality of voltage sources is a fuel cell stack and another is a battery voltage source, the system comprising:
   a vehicle;
   a switching controller configured to;
   receive a characteristic of the fuel cell stack;
   for each of the plurality of voltage sources, including but not limited to the fuel cell stack, set a proportion of a fixed switching period of time of a control signal during which the voltage source is connected to the load, wherein the proportion of the switching period is set based on the received characteristic of the fuel cell stack; and,
   control which of the plurality of voltage sources is connected to the load in accordance with the control signal and the set proportions such that an average energy provided to the load over the switching period is shared between the fuel cell and the other voltage sources, and surplus from the fuel cell, is provided to actively recharge the battery voltage source.

* * * * *